US006949294B2

(12) United States Patent
Kashiwagi et al.

(10) Patent No.: US 6,949,294 B2
(45) Date of Patent: Sep. 27, 2005

(54) RADIATION CURING SILICONE RUBBER COMPOSITION AND ADHESIVE SILICONE ELASTOMER FILM

(75) Inventors: Tsutomu Kashiwagi, Annaka (JP); Toshio Shiobara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 50 days.

(21) Appl. No.: 10/366,357

(22) Filed: Feb. 14, 2003

(65) Prior Publication Data

US 2003/0190484 A1 Oct. 9, 2003

(30) Foreign Application Priority Data

Feb. 15, 2002 (JP) ....................................... 2002-038609
Feb. 15, 2002 (JP) ....................................... 2002-038610

(51) Int. Cl.[7] ............................ C08F 2/46; C08L 83/00
(52) U.S. Cl. .......................... 428/447; 522/99; 528/31; 528/32; 528/34; 524/147; 524/358; 524/362; 525/477
(58) Field of Search ............................. 522/99; 528/26, 528/31, 32, 34; 525/477, 478

(56) References Cited

U.S. PATENT DOCUMENTS

| | | | | | |
|---|---|---|---|---|---|
| 3,517,001 | A | | 6/1970 | Berger | |
| 3,821,218 | A | | 6/1974 | Berger | |
| 4,597,987 | A | * | 7/1986 | Hockemeyer et al. | 427/513 |
| 4,929,647 | A | * | 5/1990 | Burger et al. | 522/99 |
| 5,256,754 | A | * | 10/1993 | Takarada et al. | 528/31 |
| 6,039,831 | A | * | 3/2000 | Mine et al. | 156/272.6 |
| 6,069,186 | A | | 5/2000 | Okinoshima et al. | |
| 6,312,553 | B1 | | 11/2001 | Okinoshima et al. | |

* cited by examiner

*Primary Examiner*—Margaret G. Moore
*Assistant Examiner*—Marc S. Zimmer
(74) *Attorney, Agent, or Firm*—Oblon, Spivak, McClelland, Maier & Neustadt, P.C.

(57) ABSTRACT

A radiation curing silicone rubber composition is provided. This composition includes as a base polymer either a liquid polysiloxane with a (meth)acryloyl group and a hydrosilyl group, or a combination of a liquid polysiloxane with at least two (meth)acryloyl groups and a liquid polysiloxane with a hydrosilyl group. This composition is formed into a film, and then subjected to radiation curing, thereby producing an adhesive silicone rubber elastomer film with low elasticity, adequate heat resistance, powerful adhesion and good workability. This film is useful for bonding electronic components using methods such as die bonding.

20 Claims, No Drawings

RADIATION CURING SILICONE RUBBER COMPOSITION AND ADHESIVE SILICONE ELASTOMER FILM

BACKGROUND OF THE INVENTION

1. Field of the Invention

The present invention relates to a radiation curing silicone rubber composition, an adhesive silicone elastomer film useful as an adhesive film for electronic components formed by molding such a silicone rubber composition into a film, and a silicone elastomer film-coated body, a structural body and a die bonding method using such a film.

2. Description of the Prior Art

Conventionally, epoxy based adhesive films have been used for the die bonding of semiconductor devices, and for TAB tape bonding applications. However, these adhesive films display inadequate heat resistance and are not able to be converted to low elasticity forms (if for example, a highly elastic film is bonded between two different substrates as an adhesive layer, then the film tends to display poor thermal and mechanical stress relaxation properties, leading to a reduction in product reliability). In contrast, silicone based adhesive films are typically highly heat resistant with low elasticity, but until now, silicone films with adequate adhesion and workability which are also easy to produce have remained elusive.

The inventors of the present invention have already proposed an improved adhesive silicone elastomer film (refer to Japanese Laid-open publication (kokai) No. JP2000-234060A corresponding to U.S. Pat. No. 6,312,553), although under extreme conditions such as a heat cycle test from −55° C. through to 150° C., the adhesion was still somewhat inadequate, and peeling as a result of poor adhesion was observed on occasion.

SUMMARY OF THE INVENTION

An object of the present invention is to provide a radiation curing silicone rubber composition which displays good ease of handling and enables the production of a clean film of uniform shape within a short period of time; an adhesive silicone elastomer film which enables a rationalization of the usage process, and displays low elasticity, adequate heat resistance, powerful adhesion and excellent workability; and a silicone elastomer film-coated body, a structural body and a die bonding method using such a film.

A first aspect of the present invention provides a radiation curing silicone rubber composition (hereafter referred to as a "radiation curing first silicone rubber composition") comprising:

(A) 5 to 100 parts by weight of an organohydrogenpolysiloxane with at least one group selected from the group consisting of acryloyl groups and methacryloyl groups, and at least one hydrosilyl group within each molecule, (B) 95 to 0 parts by weight of a liquid organopolysiloxane with at least two groups selected from the group consisting of acryloyl groups and methacryloyl groups within each molecule, and with no hydrosilyl groups, (wherein, the combined weight of the constituent (A) and the constituent (B) is 100 parts by weight)

(C) 0.1 to 30 parts by weight of at least one compound selected from the group consisting of alkoxysilanes, partial hydrolysis-condensation products of alkoxysilanes, organosilane modified isocyanurates and organosiloxane modified isocyanurates, and (D) an effective quantity of a radiation sensitizer.

A second aspect of the present invention provides a radiation curing silicone rubber composition (hereafter referred to as a "radiation curing second silicone rubber composition") comprising:

(B) 100 parts by weight of a liquid organopolysiloxane with at least two groups selected from the group consisting of acryloyl groups and methacryloyl groups within each molecule, (D) an effective quantity of a radiation sensitizer, and (E) 0.5 to 50 parts by weight of an organohydrogenpolysiloxane with at least one hydrosilyl group within each molecule, and with neither acryloyl groups nor methacryloyl groups, and optionally, (F) no more than 50 parts by weight of a compound selected from the group consisting of alkoxysilanes and partial hydrolysis-condensation products of alkoxysilanes.

Hereafter, in those cases in which a distinction need not be drawn between the radiation curing first silicone rubber composition and the radiation curing second silicone rubber composition, terms such as "radiation curing silicone rubber composition" or simply "composition" may be used.

A third aspect of the present invention provides an adhesive silicone elastomer film produced by forming a composition described above into a film, and then curing the film by irradiation.

Furthermore, a fourth aspect of the present invention provides a silicone elastomer film-coated body produced by covering a portion of, or all of a substrate with an aforementioned adhesive silicone elastomer film, and subsequently applying heat to bond the film to the substrate.

In addition, a fifth aspect of the present invention provides a structural body produced by sandwiching an aforementioned adhesive silicone elastomer film between two substrates, and subsequently applying heat to bond the film, thereby joining the two substrates together.

In addition, a sixth aspect of the present invention provides a die bonding method, wherein an aforementioned silicone elastomer film is positioned between a die and a predetermined position of a substrate on which the die is to be mounted, and the film is then heated and bonded while positioned between the die and the substrate.

DETAILED DESCRIPTION OF THE PREFERRED EMBODIMENTS

As follows is a more detailed description of the present invention.

<Radiation Curing First Silicone Rubber Composition>

A radiation curing first silicone rubber composition according to the present invention comprises the constituents (A) through (D) described below.

[Constituent (A)]

An organopolysiloxane of the constituent (A), with at least one group selected from the group consisting of acryloyl groups and methacryloyl groups (hereafter, the term (meth)acryloyl groups is used) and at least one hydrosilyl group (namely, SiH) within each molecule (namely, a (meth) acryloyl group containing organohydrogenpolysiloxane), is an essential component of the present invention. An organopolysiloxane of the constituent (A) comprises at least one, and preferably from 1 to 10, and even more preferably from 2 to 4 (meth)acryloyloxy group substituted monovalent hydrocarbon groups, including (meth)acryloyloxyalkyl groups such as (meth)acryloyloxyethyl groups, (meth) acryloyloxypropyl groups and (meth)acryloyloxybutyl groups, preferably as substituents bonded to silicon atoms at (both) terminals of the molecular chain; and at least one, and preferably from 2 to 200 hydrogen atoms bonded to silicon atoms (namely, hydrosilyl groups represented by the formula SiH) at the molecular chain terminals and/or at non-terminal positions within the molecular chain; and is preferably a straight chain organohydrogenpolysiloxane with a degree of polymerization (or a number of silicon atoms within the molecule) within a range from 2 to 10,000, and preferably from 10 to 1,000, and even more preferably from 20 to 200.

Suitable examples of the constituent (A) include the compounds represented by the formulas shown below.

bon groups (aryl groups or aralkyl groups) such as phenyl groups, benzyl groups and phenylethyl groups can also be used.

In addition, although compounds of the constituent (A) need only comprise one or more (meth)acryloyl groups in each molecule, in those cases in which a composition of the present invention does not include the constituent (B) described below, the constituent (A) should preferably comprise at least two (meth)acryloyl groups within each molecule.

The quantity of the constituent (A) within a composition of the present invention is within a range from 5 to 100 parts by weight, and preferably from 20 to 100 parts by weight, and even more preferably from 20 to 90 parts by weight (wherein, the combined weight of the constituent (A) and the constituent (B) described below is 100 parts by weight).

Because a composition of the present invention comprises an organopolysiloxane of the constituent (A), when an adhesive silicone elastomer film formed from the composi-

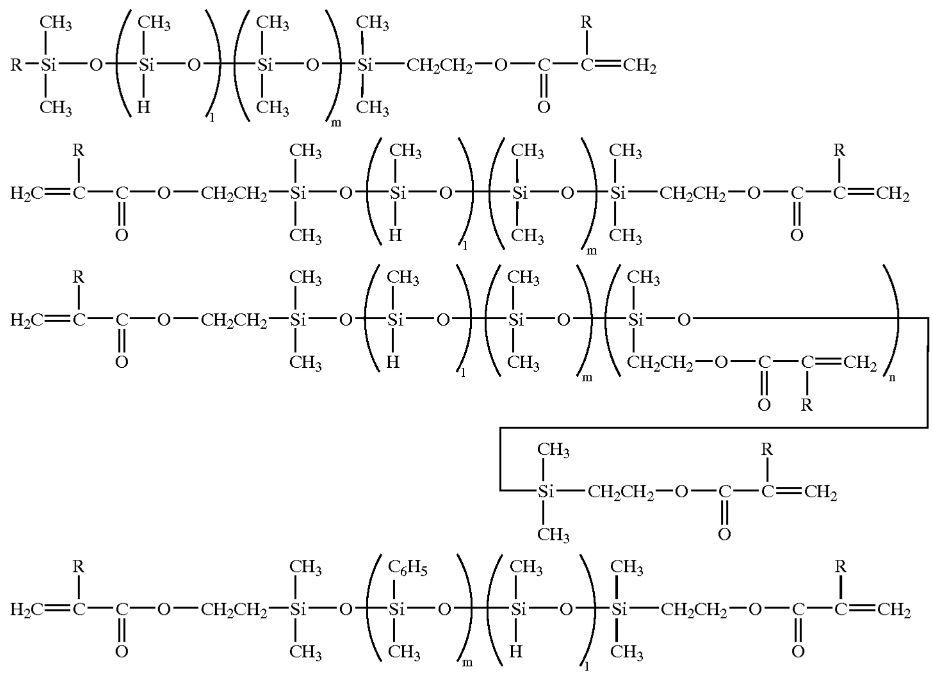

(wherein, R represents a hydrogen atom or a methyl group, l represents an integer from 1 to 8,000, and preferably from 1 to 1,000, and even more preferably from 1 to 200, m represents an integer from 0 to 8,000, and preferably from 0 to 1,000, and even more preferably from 0 to 200, n represents an integer from 1 to 8, and the sum of l and m, or the sum of l and m and n is within a range from 1 to 10,000, and preferably from 10 to 8,000 and even more preferably from 20 to 200.)

In the examples above, compounds were shown in which the substituent (the monovalent hydrocarbon group) bonded to the silicon atom was a methyl group, but the invention is not restricted to compounds with methyl groups, and compounds comprising other alkyl groups such as ethyl groups, propyl groups, isopropyl groups, butyl groups, isobutyl groups, tert-butyl groups, pentyl groups, hexyl groups, cyclohexyl groups and octyl groups, or aromatic hydrocartion is subjected to thermocompression bonding at a high temperature to any of a variety of substrates, the Si—H bonds within the constituent (A) break, and form chemical bonds (such as —OSi— or —Si—Si— bonds) with the plurality of —OH groups and —H groups (active hydrogen groups) which exist on a typical substrate surface, and consequently a powerful adhesion can be achieved between the substrate and the film. In order to ensure good adhesive strength, the temperature for the thermocompression bonding must be at least 150° C., and preferably at least 160° C.

[Constituent (B)]

Suitable examples of the liquid organopolysiloxane of the constituent (B), with at least two (meth)acryloyl groups within each molecule, and with no hydrosilyl groups, include compounds represented by the general formula (I) shown below.

(I)

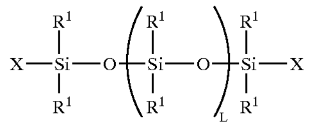

[wherein, each $R^1$ represents, independently, an unsubstituted or substituted monovalent hydrocarbon group of 1 to 9 carbon atoms, each X group represents, independently, a group represented by a general formula (II) shown below, (II)

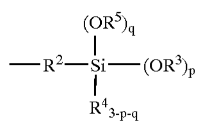

(wherein, $R^2$ represents a bivalent hydrocarbon group of 2 to 4 carbon atoms or an oxygen atom, $R^3$ represents a monovalent organic group of 4 to 25 carbon atoms comprising 1 to 3 (meth)acryloyl groups, each $R^4$ represents, independently, an unsubstituted or substituted monovalent hydrocarbon group of 1 to 9 carbon atoms, each $R^5$ represents, independently, a monovalent hydrocarbon group of 1 to 18 carbon atoms, and p is an integer from 1 to 3, q is an integer from 0 to 2, and the sum of p and q is an integer from 1 to 3), and L represents an integer within a range from 8 to 10,000, and preferably from 18to 1,000, and even more preferably from 48 to 500.]

The number of (meth)acryloyl groups within each molecule of the compound represented by the general formula (I) is preferably at least three, and even more preferably four or greater.

In the general formula (I) described above, $R^1$ is preferably a substituted or unsubstituted monovalent hydrocarbon group of 1 to 6 carbon atoms. Specific examples of this monovalent hydrocarbon group include alkyl groups such as methyl groups, ethyl groups, propyl groups, isopropyl groups, butyl groups, isobutyl groups, tert-butyl groups, pentyl groups, hexyl groups, heptyl groups, 2-ethylhexyl groups, octyl groups and nonyl groups; cycloalkyl groups such as cyclohexyl groups and cycloheptyl groups; alkenyl groups such as vinyl groups, allyl groups, propenyl groups, isopropenyl groups, butenyl groups and hexenyl groups; aryl groups such as phenyl groups and tolyl groups; aralkyl groups such as benzyl groups, phenylethyl groups and phenylpropyl groups; as well as groups in which at least a portion of the hydrogen atoms bonded to carbon atoms within the aforementioned groups have been substituted with substituents such as halogen atoms or cyano groups, such as chloromethyl groups, cyanoethyl groups and trifluoropropyl groups. However, compounds in which at least 50 mol % of the $R^1$ groups are methyl groups and no more than 25 mol % are phenyl groups are preferred, and compounds in which at least 80 mol %, and even more preferably at least 90 mol % (namely, 80 to 100 mol %, 90 to 100 mol %) of the $R^1$ groups are methyl groups, and no more than 10 mol % (namely, 0 to 10 mol %) are phenyl groups are particularly desirable.

From the viewpoint of water resistance, the $R^2$ group in the general formula (II) above is preferably a bivalent hydrocarbon group. Specific examples of this bivalent hydrocarbon group include alkylene groups of 2 to 4 carbon atoms such as ethylene groups, propylene groups, methylethylene groups and tetramethylene groups, although ethylene groups are preferred.

In addition, the $R^3$ group in the general formula (II) above preferably comprises from 2 to 3, and even more preferably 3 (meth)acryloyl groups (particularly as (meth)acryloyloxy groups). Specific examples of the (meth)acryloyl groups are represented by the formulas $CH_2{=}CHCO—$ and $CH_2{=}C(CH_3)CO—$. Specific examples of the $R^3$ group include alkyl groups of 1 to 10, and preferably from 2 to 6 carbon atoms substituted with 1 to 3 acryloyloxy groups or methacryloyloxy groups such as $CH_2{=}CHCOOCH_2CH_2—$, $[CH_2{=}C(CH_3)COOCH_2]_3C—CH_2—$, $(CH_2{=}CHCOOCH_2)_3C—CH_2—$ and $(CH_2{=}CHCOOCH_2)_2C(C_2H_5)CH_2—$, although preferred structures include $CH_2{=}CHCOOCH_2CH_2—$, $[CH_2{=}C(CH_3)COOCH_2]_3C—CH_2—$, $(CH_2{=}CHCOOCH_2)_3C—CH_2—$, $(CH_2{=}CHCOOCH_2)_2C(C_2H_5)CH_2—$, $CH_2{=}C(CH_3)COOCH_2CH_2—$, $[CH_2{=}C(CH_3)COOCH_2]_2C(C_2H_5)—CH_2—$ and $(CH_2{=}CHCOOCH_2)[CH_2{=}C(CH_3)COOCH_2]CH—$, and the most preferred structures are $[CH_2{=}C(CH_3)COOCH_2]_3C—CH_2—$, $(CH_2{=}CHCOOCH_2)_3C—CH_2—$, $(CH_2{=}CHCOOCH_2)_2C(C_2H_5)CH_2—$, and $(CH_2{=}CHCOOCH_2)[CH_2{=}C(CH_3)COOCH_2]CH—$.

The $R^4$ group in the general formula (II) above is preferably a substituted or unsubstituted monovalent hydrocarbon group of 1 to 6 carbon atoms. Specific example of the $R^4$ group include those groups listed above in relation to the $R^1$ group of the general formula (I), and in the same manner as the $R^1$ group, compounds in which at least 50 mol % of the $R^4$ groups are methyl groups and no more than 25 mol % are phenyl groups are preferred, and compounds in which at least 80 mol %, and even more preferably at least 90 mol % (namely, 80 to 100 mol %, 90 to 100 mol %) of the $R^4$ groups are methyl groups, and no more than 10 mol % (namely, 0 to 10 mol %) are phenyl groups are particularly desirable.

The $R^5$ group in the general formula (II) above is preferably a substituted or unsubstituted monovalent hydrocarbon group of 1 to 8 carbon atoms. Specific examples of the $R^5$ group include alkyl groups such as methyl groups, ethyl groups, propyl groups, butyl groups, pentyl groups, and neopentyl groups; cycloalkyl groups such as cyclohexyl groups; aryl groups such as phenyl groups; and alkenyl groups such as allyl groups, propenyl groups and butenyl groups, although preferably excluding aliphatic unsaturated groups such as alkenyl groups.

Furthermore, in the general formula (I), L is preferably an integer within a range from 48 to 1,000.

Specific examples of the organopolysiloxane represented by the general formula (I) include the formulas shown below.

(1-1)
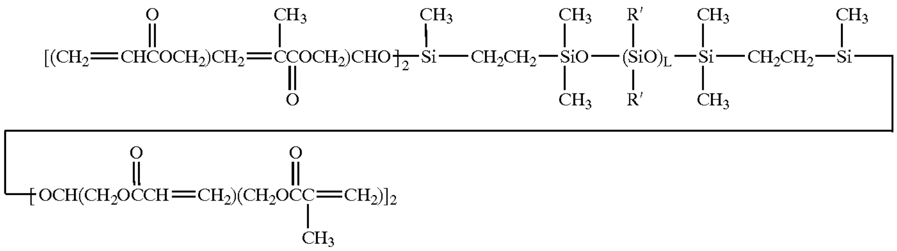
(1-2)
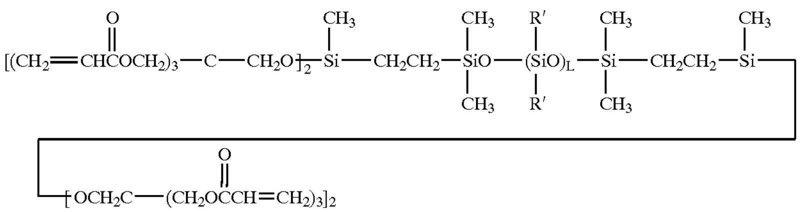
(1-3)
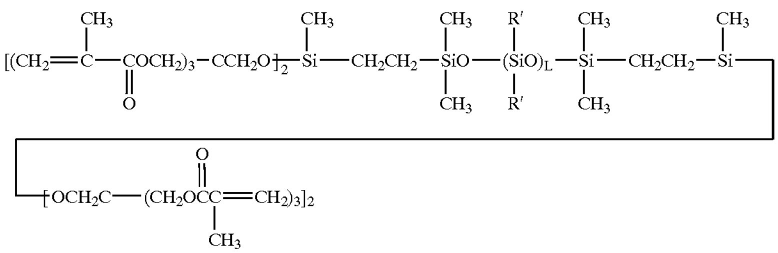
(1-4)
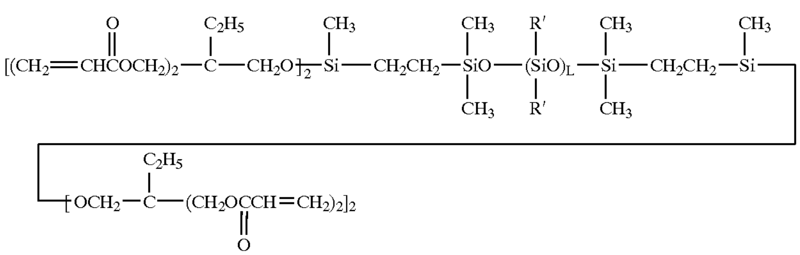
(1-5)
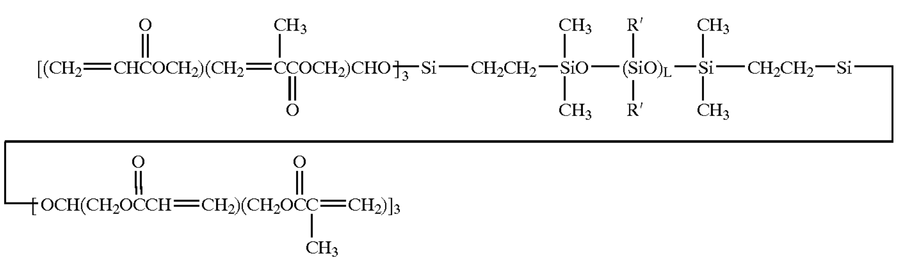
(1-6)
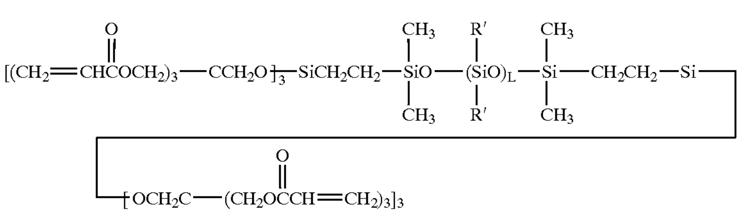

-continued
(1-7)
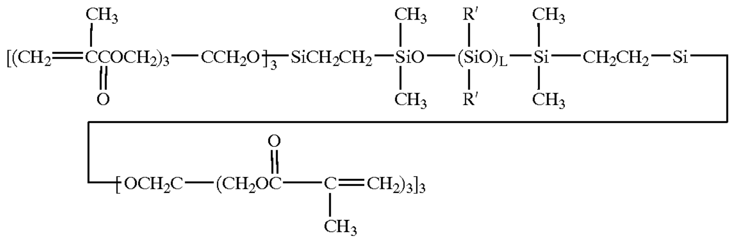
(1-8)
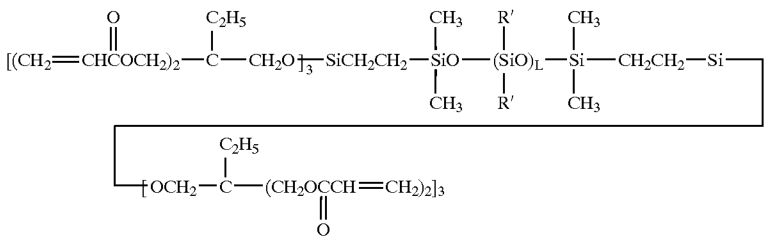
(1-9)
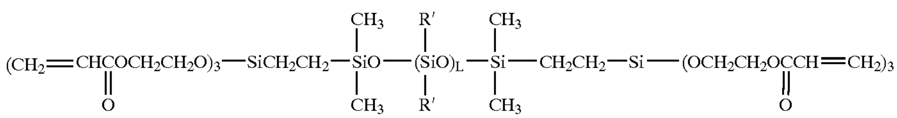
(1-10)
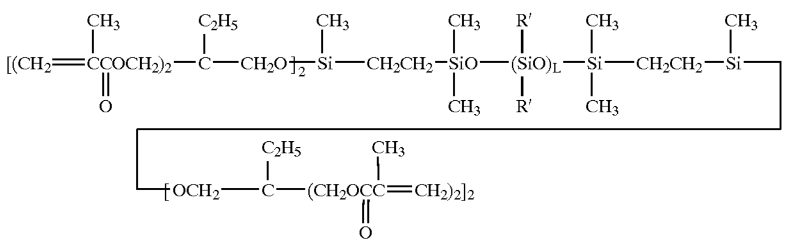
(1-11)
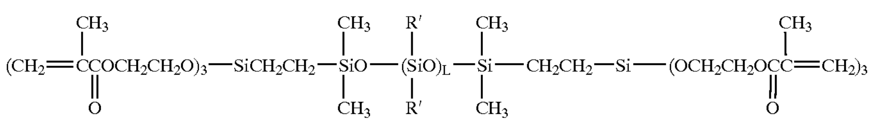
(1-12)
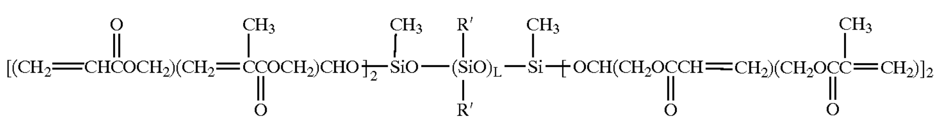
(1-13)
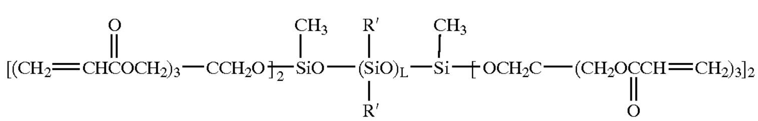
(1-14)
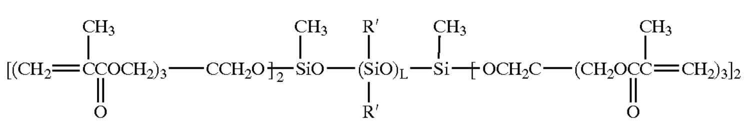
(1-15)
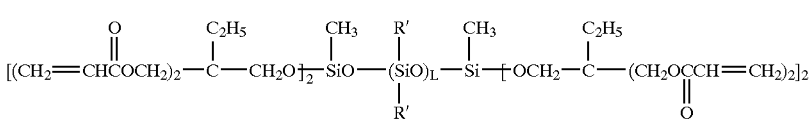
(1-16)
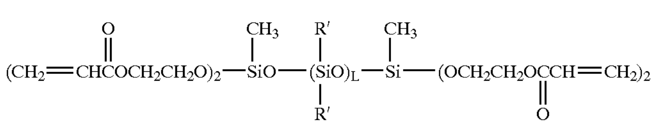

-continued (1-17)

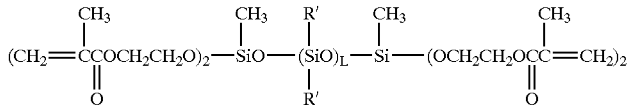

(1-18)

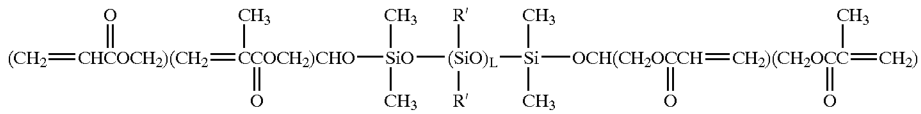

(1-19)

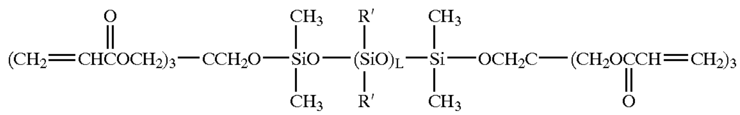

(1-20)

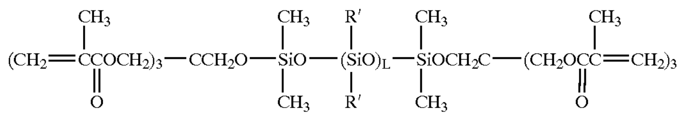

(1-21)

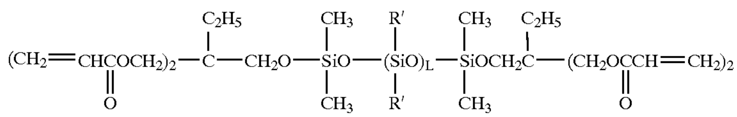

(1-22)

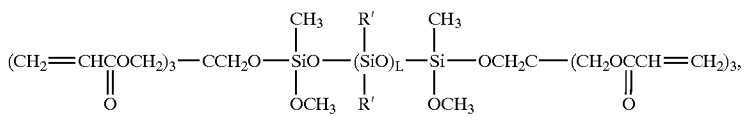

and (I-23)

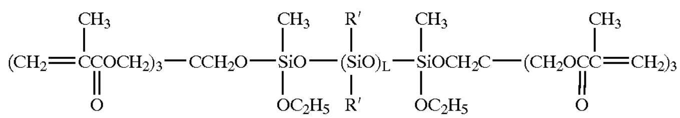

(wherein, R' represents a methyl group, a phenyl group or a 3,3,3-trifluoropropyl group, and L is as defined above).

An organopolysiloxane of the constituent (B) represented by the aforementioned general formula (I) comprises —$OR^3$ radiation sensitive groups (in other words, comprises from 2 to 18, and preferably from 3 to 12, and even more preferably from 4 to 12 (meth)acryloyl groups within each molecule), and consequently is easily cured by irradiation with radiation such as ultraviolet radiation. This organopolysiloxane may utilize either a single compound or a combination of two or more different compounds.

An organopolysiloxane of the aforementioned general formula (I) can be produced by, for example, a dehydrochlorination reaction of the corresponding chlorosiloxane and a (meth)acryloyl functional compound with an active hydroxyl group. Examples of this chlorosiloxane include those compounds represented by the formulas shown below.

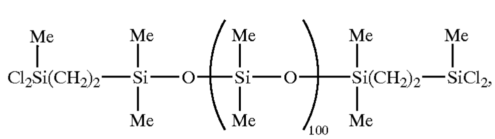

-continued

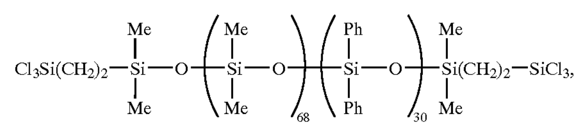

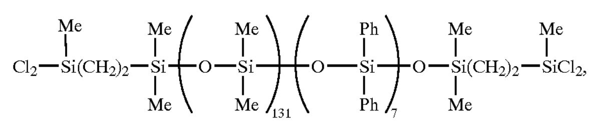

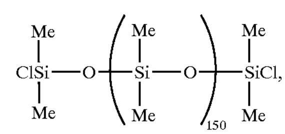

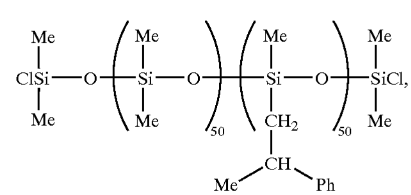

-continued

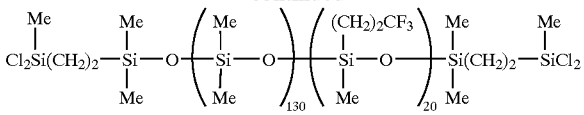

(wherein, Me represents a methyl group, and Ph represents a phenyl group).

Examples of the aforementioned (meth)acryloyl functional compound with an active hydroxyl group include 2-hydroxyethyl(meth)acrylate, trimethylolpropanedi(meth) acrylate, pentaerythritoltri(meth)acrylate and 2-hydroxy-1-acryloxy-3-methacryloxypropane, although taking into consideration the fact that the target organopolysiloxane preferably comprises groups containing from 2 to 9 (meth) acryloyl groups bonded to the silicon atoms at each terminal, trimethylolpropanedi(meth)acrylate, pentaerythritoltri (meth)acrylate and 2-hydroxy-1-acryloxy-3-methacryloxypropane are preferred, and pentaerythritoltri (meth)acrylate is particularly desirable.

The quantity of the constituent (B) within a composition of the present invention is within a range from 95 to 0 parts by weight, and preferably from 80 to 0 parts by weight, and even more preferably from 80 to 10 parts by weight (wherein, the combined weight of the constituent (A) described above and the constituent (B) is 100 parts by weight).

[Constituent (C)]

Suitable examples of the alkoxysilanes or partial hydrolysis-condensation products of alkoxysilanes (namely, organopolysiloxanes (oligomers) with at least one, and preferably at least two residual alkoxy groups within each molecule) of the constituent (C) include the compounds listed below.

Namely, tetraalkoxysilanes such as tetramethoxysilane, tetraethoxysilane, tetrapropoxysilane, tetra(isopropoxy) silane, tetrabutoxysilane, tetra(isobutoxy)silane and tetra (tert-butoxy)silane; trialkoxyhydrogensilanes such as trimethoxysilane, triethoxysilane, tripropoxysilane, tri (isopropoxy)silane, tributoxysilane, tri(isobutoxy)silane and tri(tert-butoxy)silane; organotrialkoxysilanes with a lower alkyl group or an aryl group or the like as a monovalent hydrocarbon group such as methyltrimethoxysilane, methyltriethoxysilane, ethyltrimethoxysilane, ethyltriethoxysilane, vinyltrimethoxysilane, vinyltriethoxysilane, phenyltrimethoxysilane and phenyltriethoxysilane; as well as partial hydrolysis-condensation products of these alkoxysilanes (namely, organopolysiloxanes (oligomers) with at least one, and preferably at least two residual alkoxy groups within each molecule); and the organopolysiloxanes shown below.

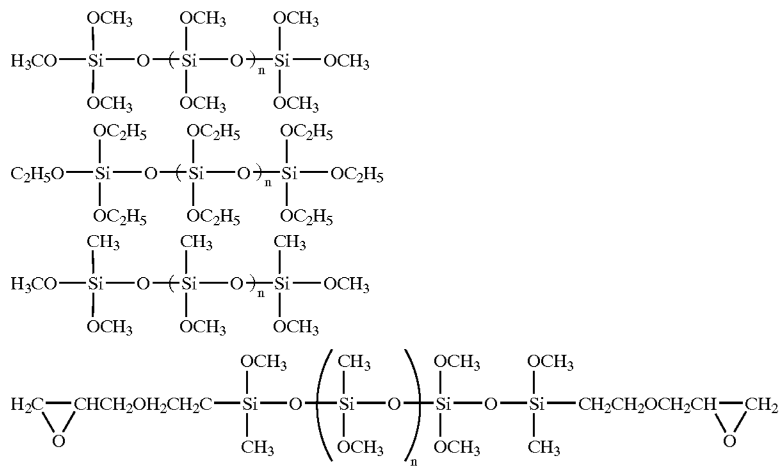

(in each of the above formulas, n represents an integer from 0 to 100, and preferably from 0 to 50.)

In addition, the organosilane or organosiloxane modified isocyanurates of the constituent (C) can be synthesized by performing an addition reaction between an isocyanurate with an alkenyl group such as a vinyl group or an allyl group, and an organosilane or organosiloxane with a SiH group, in the presence of a platinum catalyst (refer to Japanese Post-Examination publication (kokoku) No. JP45-23354B corresponding to U.S. Pat. No. 3,821,218 and U.S. Pat. No. 3,517,001). Examples of this type of constituent include the compounds represented by the formulas shown below.

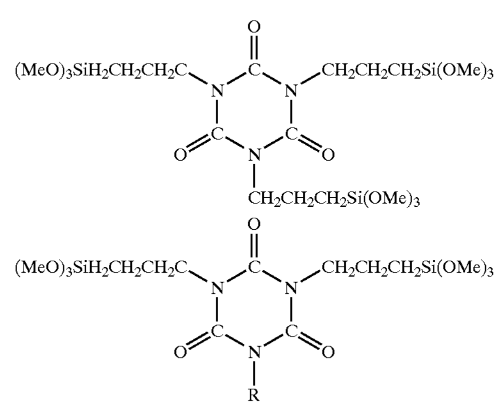

-continued

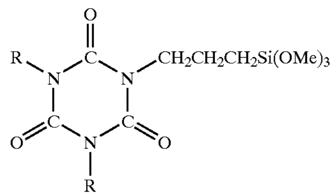

(wherein, each R represents, independently, a hydrogen atom, an alkyl group, an aralkyl group, a lower alkenyl group or an aryl group.)

Including the constituent (C) in a composition of the present invention improves the adhesive strength of the composition at lower temperatures.

The quantity of the constituent (C) is within a range from 0.1 to 30 parts by weight, and preferably from 0.5 to 20 parts by weight per 100 parts by weight of the combined weight of the constituent (A) and the constituent (B).

[Constituent (D)]

There are no particular restrictions on the radiation sensitizer of the constituent (D), although benzoyl compounds (or phenylketone compounds) such as benzophenone are preferred, and specific examples include benzoyl compounds (or phenylketone compounds) with a hydroxy group on the c-position carbon atom of a carbonyl group such as 1-hydroxy-cyclohexylphenylketone, 2-hydroxy-2-methyl-1-phenylpropan-1-one and 1-(4-isopropylphenyl)-2-hydroxy-2-methylpropan-1-one; organophosphine oxide compounds such as 2,4,6-trimethylbenzoyldiphenylphosphine oxide, bisacylmonoorganophosphine oxide and bis(2,6-dimethoxybenzoyl)-2,4,4-trimethylpentylphosphine oxide; as well as benzoin ether compounds such as isobutylbenzoin ether; ketal compounds such as acetophenonediethylketal; thioxanthone based compounds; and acetophenone based compounds. These compounds may be used singularly, or in combinations of two or more compounds.

The quantity of the constituent (D) need only be an effective quantity, typically within a range from 0.5 to 10 parts by weight, and preferably from 1.0 to 5.0 parts by weight per 100 parts by weight of the combined weight of the constituent (A) and the constituent (B).

<Radiation Curing Second Silicone Rubber Composition>

A radiation curing second silicone rubber composition according to the present invention comprises constituents (B), (D) and (E) (and in some cases a constituent (F)) described below.

[Constituent (B)]

The liquid organopolysiloxane of the constituent (B), with at least two (meth)acryloyl groups, and with neither acryloyl groups nor methacryloyl groups, within each molecule is used as a base polymer, and utilizes the same compounds described above in relation to the constituent (B) of the radiation curing first silicone rubber composition.

[Constituent (D)]

The radiation sensitizer of the constituent (D) utilizes the same compounds described above in relation to the constituent (D) of the radiation curing first silicone rubber composition.

The quantity of the constituent (D) need only be an effective quantity, typically within a range from 0.5 to 10 parts by weight, and preferably from 1.0 to 5.0 parts by weight per 100 parts by weight of the constituent (B).

[Constituent (E)]

An organohydrogenpolysiloxane of the constituent (E), with at least one hydrosilyl group within each molecule, is characterized by the presence of the hydrosilyl group (namely, a hydrogen atom bonded to a silicon atom, represented by the formula SiH), and incorporating this constituent (E) within a film means that when the film is subjected to thermocompression bonding at a high temperature to any of a variety of substrates, the Si—H bonds within the organohydrogenpolysiloxane break, and form chemical bonds (such as —OSi— or —Si—Si— bonds) with the plurality of —OH groups and —H groups (active hydrogen groups) which exist on a typical substrate surface, and consequently a powerful adhesion can be achieved between the substrate and the film. In order to ensure good adhesive strength, the temperature for the thermocompression bonding must be at least 150° C., and preferably at least 200° C. The quantity of the constituent (E) is within a range from 0.5 to 50 parts by weight, and preferably from 1 to 30 parts by weight, and even more preferably from 1 to 20 parts by weight per 100 parts by weight of the organopolysiloxane of the constituent (B).

There are no particular restrictions on the molecular structure of the organohydrogenpolysiloxane of the constituent (E), and conventionally available linear, branched or three dimensional network structures (resins) can be used, although the structure must comprise at least one, and preferably at least two, and even more preferably three or more hydrogen atoms bonded to silicon atoms (hydrosilyl groups represented by the formula SiH) within each molecule, and should typically comprise from 1 to 500, and preferably from 2 to 200, and even more preferably from 3 to 100 of such SiH groups. Suitable examples of this type of organohydrogenpolysiloxane include the compounds represented by the composition formula (3) shown below.

$$R^6_bH_cSiO_{(4-b-c)/2} \quad (3)$$

In the above formula (3), $R^6$ represents an unsubstituted or substituted monovalent hydrocarbon group, preferably of 1 to 10 carbon atoms, bonded to a silicon atom, or an alkoxy group of 1 to 4 carbon atoms, but excluding aliphatic unsaturated bonds. Examples of the unsubstituted or substituted monovalent hydrocarbon groups of this group $R^6$ include alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, octyl groups, nonyl groups and decyl groups; aryl groups such as phenyl groups, tolyl groups, xylyl groups and naphthyl groups; aralkyl groups such as benzyl groups, phenylethyl groups and phenylpropyl groups; as well as groups in which either a portion of, or all of the hydrogen atoms of the aforementioned groups have been substituted with halogen atoms such as fluorine atoms, bromine atoms or chlorine atoms, or cyano groups, such as chloromethyl groups, chloropropyl groups, bromoethyl groups, trifluoropropyl groups and cyanoethyl groups. In some cases, two unsubstituted or substituted monovalent hydrocarbon $R^6$ groups may be bonded together to form a bivalent hydrocarbon group of 2 to 6 carbon atoms such as an ethylene group, a propylene group, a tetramethylene group or a hexamethylene group. Furthermore, examples of the aforementioned alkoxy group include methoxy groups, ethoxy groups, propoxy groups, isopropoxy groups, butoxy groups, isobutoxy groups and tert-butoxy groups. Preferred unsubstituted or substituted monovalent hydrocarbon $R^6$ groups include alkyl groups and aryl groups, particularly methyl groups and phenyl groups. Preferred alkoxy groups are methoxy groups and ethoxy groups. In addition, b represents a positive number from 0.7 to 2.1, and c represents a positive number from 0.001 to 1.0, although b+c must be from 0.8 to 3.0, and b values from 1.0 to 2.0, c values from 0.01 to 1.0, and b+c values from 1.5 to 2.5 are particularly preferred.

The constituent (E) must have at least one, and preferably at least two, and even more preferably three or more SiH groups within each molecule, and these SiH groups may be positioned at the terminals of the molecular chain, at non-terminal positions within the molecular chain, or at both these positions. Furthermore, the molecular structure of this organohydrogenpolysiloxane may be a straight chain structure, a cyclic structure, a branched chain structure or a three dimensional network structure, although the number of silicon atoms within each molecule (or the degree of polymerization) is typically within a range from 2 to 1,000, and preferably from 3 to 300, and even more preferably from 4 to 150, and the constituent (E) is a liquid at room temperature (25° C.) with a viscosity at 25° C. within a range from 1 to 100,000 mPa·s, and preferably from 1 to 5,000 mPa·s.

The constituent (E) can be produced using conventionally known production methods. In a typical production method, octamethylcyclotetrasiloxane and/or 1,3,5,7-tetramethyl-1,3,5,7-tetrahydrocyclotetrasiloxane, and 1,3-dihydro-1,1,3,3-tetramethyldisiloxane as a terminal group source, or alternatively, 1,3,5,7-tetramethyl-1,3,5,7-tetrahydrocyclotetrasiloxane (and octamethylcyclotetrasiloxane) and hexamethyldisiloxane as a terminal group source, are subjected to equilibration in the presence of a catalyst such as sulfuric acid, trifluoromethanecarboxylic acid or methanecarboxylic acid, at a temperature of −10 to +40° C.

Specific examples of the organohydrogenpolysiloxane of the formula (3) include 1,3-dihydro-1,1,3,3-tetramethyldisiloxane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane, dimethylsiloxane and diphenylsiloxane with both terminals blocked with dimethylhydrogensiloxy groups, copolymers formed from $(CH_3)_2HSiO_{1/2}$ units, $(CH_3)_3SiO_{1/2}$ units and $SiO_{4/2}$ units, copolymers formed from $(CH_3)_2HSiO_{1/2}$ units and $SiO_{4/2}$ units, and copolymers formed from $(CH_3)_2HSiO_{1/2}$ units, $SiO_{4/2}$ units and $(C_6H_5)_3SiO_{1/2}$ units, as well as compounds of the formulas shown below.

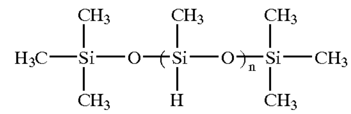

(wherein, n represents an integer from 6 to 98)

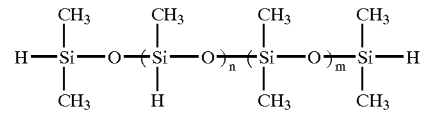

(wherein, n represents an integer from 1 to 100, m represents an integer from 1 to 200, and n+m represents an integer from 2 to 300)

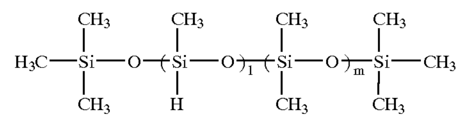

(wherein, l represents an integer from 1 to 100, m represents an integer from 1 to 200, and l+m represents an integer from 2 to 300)

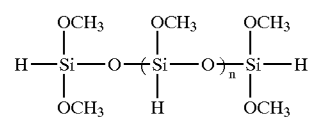

(wherein, n represents an integer from 1 to 20)

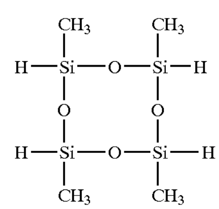

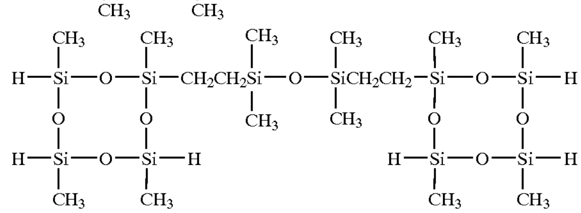

[Constituent (F)]

The constituent (F), i.e., at least one compound selected from the group consisting of alkoxysilanes and partial hydrolysis-condensation products of alkoxysilanes is optionally combined with the constituent (E) to produce a synergistic strengthening of the adhesion of a film of the present invention. The quantity of the constituent (F) should be no more than 50 parts by weight (i.e., from 0 to 50 parts by weight), and preferably within a range from 0.1 to 20 parts by weight, and even more preferably from 0.5 to 10 parts by weight per 100 parts by weight of the organopolysiloxane of the constituent (B).

Specific examples of the alkoxysilanes or the partial hydrolysis-condensation products of alkoxysilanes (in other words, organopolysiloxanes (oligomers) with at least one, and preferably at least two residual alkoxy groups within each molecule) of the constituent (F) include the compounds shown below.

Namely, tetraalkoxysilanes such as tetramethoxysilane, tetraethoxysilane, tetrapropoxysilane, tetra(isopropoxy) silane, tetrabutoxysilane, tetra(isobutoxy)silane and tetra (tert-butoxy)silane; organotrialkoxysilanes with a lower alkyl group or an aryl group or the like as a monovalent hydrocarbon group such as methyltrimethoxysilane, methyltriethoxysilane, ethyltrimethoxysilane, ethyltriethoxysilane, vinyltrimethoxysilane, vinyltriethoxysilane, phenyltrimethoxysilane and phenyltriethoxysilane; as well as partial hydrolysis-condensation products of these alkoxysilanes (namely, organopolysiloxanes (oligomers) with at least one, and preferably at least two residual alkoxy groups within each molecule); and the organopolysiloxanes shown below.

An adhesive silicone elastomer film of the present invention includes those cases in which the composition is formed into a sheet.

<Production of a Coated Body>

A coated body of the present invention can be produced by covering a portion of, or all of a substrate with a silicone elastomer film obtained in the manner described above, and subsequently applying heat to bond the film to the substrate. The heating temperature is preferably within a range from 80 to 250° C., and even more preferably from 100 to 200° C. Examples of suitable substrates include metals such as Si, Al, Cu, Ni, Cr, Au, Ag, and other metals, epoxy resins, bakelite, polyimides, polyesters and silicone resins and the like.

<Production of a Structural Body>

A structural body of the present invention can be produced by sandwiching an aforementioned silicone elastomer film between two substrates, and subsequently applying heat to bond the film to the two substrates, thereby joining the two substrates together. The heating temperature is preferably within a range from 80 to 250° C., and even more preferably from 100 to 200° C. Examples of suitable substrates include metals such as Si, Al, Cu, Ni, Cr, Au, Ag, and other metals, epoxy resins, bakelite, polyimides, polyesters and silicone resins and the like.

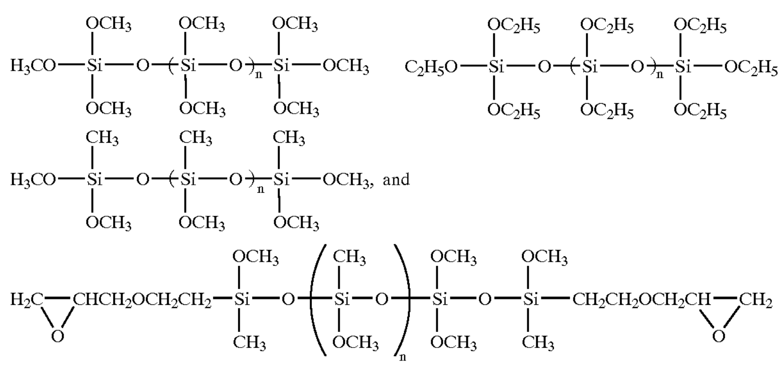

(in each of the above formulas, n represents an integer from 0 to 100, and preferably from 0 to 50.)

<Adhesive Silicone Elastomer Film>

An adhesive silicone elastomer film of the present invention can be produced by forming a radiation curing silicone rubber composition described above into a film, and then curing the film by irradiation.

A composition of the present invention is in a paste form, and can be formed continuously using a commercially available coater. Furthermore, the ultraviolet radiation cross linking type curing process for the composition can be performed continuously using a commercially available ultraviolet irradiation device (such as a mercury lamp, a high pressure mercury lamp, a metal halide lamp, or a xenon mercury lamp). The radiation energy is preferably within a range from 200 to 10,000 mJ/cm$^2$, and the illumination intensity is preferably within a range from 40 to 1,000 mW/cm$^2$. In addition, in order to prevent the effects of heat generation, the interior of the irradiation device is preferably cooled with a fan or the like.

<Die Bonding Method>

A die bonding method of the present invention can be conducted using a typical commercially available die bonding mounter. Furthermore, a similar effect can be achieved using a heat press or the like.

For example, an adhesive silicone elastomer film is mounted on top of a substrate (board), a pressure tool with a semiconductor chip mounted thereon is crimped against the film while being heated, and the semiconductor chip becomes integrated with the substrate (board) through the medium of the silicone elastomer film, forming a bonded structure.

EXAMPLES

As follows is a more detailed description of the present invention based on a series of examples (and comparative examples). In the examples below, the unit "parts" refers to parts by weight, and in the formulas, Me represents a methyl group, Ph represents a phenyl group, and Et represents an ethyl group. Acryloyl functional organopolysiloxanes were synthesized in accordance with the method described in Japanese Laid-open publication (kokai) No. 2000-234060 (JP2000-234060A) corresponding to U.S. Pat. No. 6,312,553.

Example 1

(B) 100 parts of a (meth)acryloyl group containing organopolysiloxane with a structure shown below,

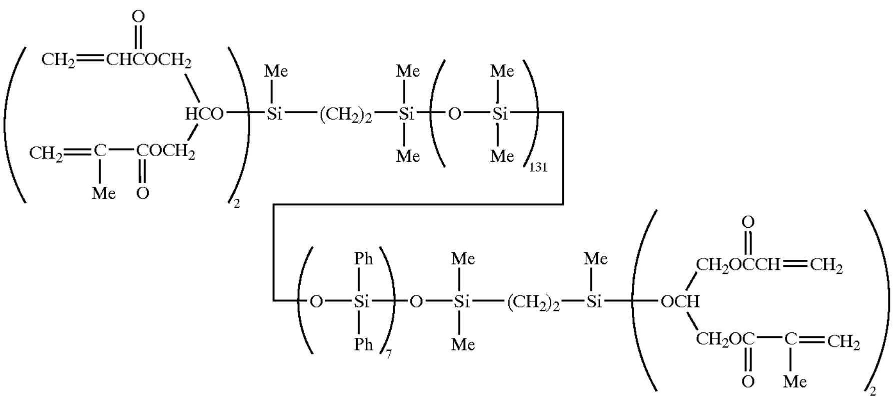

(D) 2 parts of 2-hydroxy-2-methyl-1-phenylpropan-1-one, (C) 3 parts of a partial hydrolysis-condensation product of tetramethoxysilane with a structure shown below, and

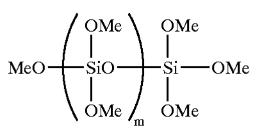

(a mixture in which m represents an integer of 1 to 7)

(A) 20 parts of an acryloyl group containing methylhydrogenpolysiloxane with a structure shown below were mixed together and yielded a radiation curing silicone rubber composition (with a weight referenced ratio (C)/[(A)+(B)]=2.5/100).

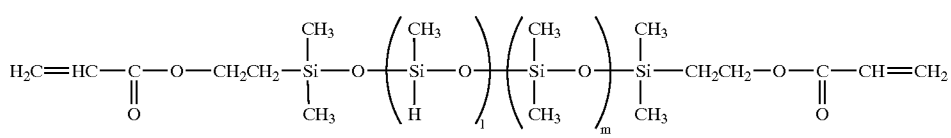

(wherein, l=20 and m=80)

This composition was poured into a Ni plated mold (height 100 mm×width 100 mm×depth 1 mm), and then irradiated with ultraviolet radiation (radiation dose: 800 mJ/cm$^2$) for 2 seconds inside a conveyor furnace equipped with two metal halide mercury lamps (illumination intensity: 400 mW/cm$^2$) to cure the composition. The hardness of the thus obtained adhesive silicone elastomer film was measured in accordance with JIS K6301. The hardness value was measured using a spring type A hardness tester. The result is shown in Table 1.

Next, the silicone elastomer film was cut into pieces 25 mm high×10 mm wide, a piece of film was sandwiched between two test piece substrates (boards) formed from aluminum, silicon wafer, polyimide film, glass or polycarbonate, and each structure was then crimped at a pressure of 9.81 kPa (100 gf/cm$^2$) and heated for 60 minutes at 150° C. to cure the film and complete the production of a structural body. The shear adhesion was then measured. The results are shown in Table 2.

Example 2

With the exception of using 3 parts of an epoxy group containing polyalkoxysiloxane with a structure shown below instead of the 3 parts of the partial hydrolysis-condensation product of tetramethoxysilane of the constituent (C) above, a composition was prepared in the same manner as the example 1, and this composition was then used to produce an adhesive silicone elastomer film and a series of structural bodies, which were subjected to the same tests as the example 1. The results of the tests are shown in Table 1 and Table 2.

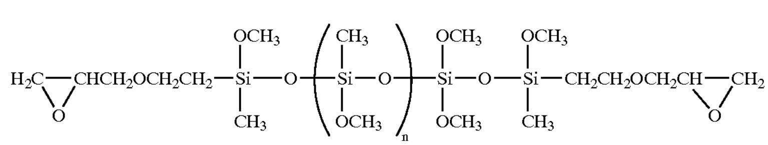

(wherein, n=6)

Example 3

With the exception of using 1 part of a triisocyanurate silicone modified compound with a structure shown below instead of the 3 parts of the partial hydrolysis-condensation product of tetramethoxysilane of the constituent (C) above, a composition was prepared in the same manner as the example 1 (with a weight referenced ratio (C)/[(A)+(B)]=0.8/100), and this composition was then used to produce an adhesive silicone elastomer film and a series of structural bodies, which were subjected to the same tests as the example 1. The results of the tests are shown in Table 1 and Table 2.

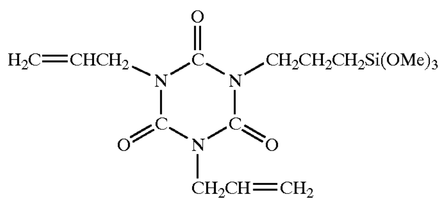

Example 4

With the exception of using 20 parts of an acryloyl group containing methylhydrogenpolysiloxane with a structure shown below instead of the 20 parts of the acryloyl group containing methylhydrogenpolysiloxane of the constituent (A) above, a composition was prepared in the same manner as the example 1, and this composition was then used to produce an adhesive silicone elastomer film and a series of structural bodies, which were subjected to the same tests as the example 1. The results of the tests are shown in Table 1 and Table 2.

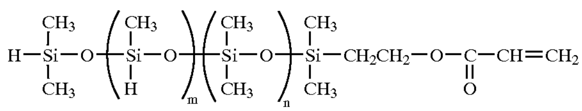

(wherein, m=20, n=20)

Example 5

With the exception of altering the quantity added of the acryloyl group containing methylhydrogenpolysiloxane of the constituent (A) above from 20 parts to 5.0 parts, a composition was prepared in the same manner as the example 1 (with a weight referenced ratio (C)/[(A)+(B)]=2.9/100), and this composition was then used to produce an adhesive silicone elastomer film and a series of structural bodies, which were subjected to the same tests as the example 1. The results of the tests are shown in Table 1 and Table 2.

Example 6

With the exception of altering the quantity added of the acryloyl group containing methylhydrogenpolysiloxane of the constituent (A) above from 20 parts to 100 parts, a composition was prepared in the same manner as the example 1 (with a weight referenced ratio (C)/[(A)+(B)]=1.5/100), and this composition was then used to produce an adhesive silicone elastomer film and a series of structural bodies, which were subjected to the same tests as the example 1. The results of the tests are shown in Table 1 and Table 2.

Example 7

With the exceptions of removing the (meth)acryloyl group containing polysiloxane (100 parts) of the constituent (B) above, and altering the quantity added of the acryloyl group containing methylhydrogenpolysiloxane of the constituent (A) above from 20 parts to 100 parts, a composition was prepared in the same manner as the example 1 (with a weight referenced ratio (C)/[(A)+(B)]=3/100), and this composition was then used to produce an adhesive silicone elastomer film and a series of structural bodies, which were subjected to the same tests as the example 1. The results of the tests are shown in Table 1 and Table 2.

Comparative Example 1

With the exception of removing the acryloyl group containing methylhydrogenpolysiloxane (20 parts) of the constituent (A) above, a composition was prepared in the same manner as the example 1 (with a weight referenced ratio (C)/[(A)+(B)]=(C)/(B)=3/100), and this composition was then used to produce an adhesive silicone elastomer film and a series of structural bodies, which were subjected to the same tests as the example 1. The results of the tests are shown in Table 1 and Table 2.

Comparative Example 2

With the exception of altering the quantity added of the partial hydrolysis-condensation product of tetramethoxysilane of the constituent (C) above from 3 parts to 0.05 parts, a composition was prepared in the same manner as the example 1 (with a weight referenced ratio (C)/[(A)+(B)]=0.04/100), and this composition was then used to produce an adhesive silicone elastomer film and a series of structural bodies, which were subjected to the same tests as the example 1. The results of the tests are shown in Table 1 and Table 2.

Comparative Example 3

With the exception of altering the quantity added of the partial hydrolysis-condensation product of tetramethoxysilane of the constituent (C 50 parts, a composition was prepared in the same manner as the example 1 (with a weight referenced ratio (C)/[(A)+(B)]=42/100), and this composition was then used to produce an adhesive silicone elastomer film and a series of structural bodies, which were subjected to the same tests as the example 1. The results of the tests are shown in Table 1 and Table 2.

Comparative Example 4

With the exception of altering the quantity added of the acryloyl group containing methylhydrogenpolysiloxane of the constituent (A) above from 20 parts to 1 part, a composition was prepared in the same manner as the example 1 (with a weight referenced ratio (C)/[(A)+(B)]=3.0/100), and this composition was then used to produce an adhesive silicone elastomer film and a series of structural bodies, which were subjected to the same tests as the example 1. The results of the tests are shown in Table 1 and Table 2.

TABLE 1

| <Hardness values following irradiation at 800 mJ/cm$^2$> | | | | | | | |
|---|---|---|---|---|---|---|---|
| | Example 1 | Example 2 | Example 3 | Example 4 | Example 5 | Example 6 | Example 7 |
| Hardness | 50 | 51 | 52 | 49 | 50 | 50 | 50 |

| | Comparative example 1 | Comparative example 2 | Comparative example 3 | Comparative example 4 |
|---|---|---|---|---|
| Hardness | 52 | 49 | did not cure | 50 |

Note:
Measurements were conducted using a spring type A hardness tester as specified in JIS K6301.

TABLE 2

| Heat curing conditions | Substrates | Examples 1 | 2 | 3 | 4 | 5 | 6 | 7 |
|---|---|---|---|---|---|---|---|---|
| 150° C. 60 minutes | Silicon wafer | 1.1 | 1.2 | 1.5 | 1.2 | 0.9 | 1.5 | 1.5 |
| | Aluminum | 1.2 | 1.2 | 1.6 | 1.2 | 0.9 | 1.5 | 1.4 |
| | Glass | 1.2 | 1.2 | 1.6 | 1.2 | 0.9 | 1.6 | 1.4 |
| | Polyimide film | 1.2 | 1.2 | 1.6 | 1.2 | 0.9 | 1.5 | 1.5 |
| | Polycarbonate | 0.8 | 0.9 | 1.2 | 1.2 | 0.7 | 1.5 | 1.5 |

| Heat curing conditions | Substrates | Comparative Examples 1 | 2 | 3 | 4 |
|---|---|---|---|---|---|
| 150° C. 60 minutes | Silicon wafer | 0.5 | 0.7 | <0.1 | 0.5 |
| | Aluminum | 0.5 | 0.7 | <0.1 | 0.5 |
| | Glass | 0.5 | 0.7 | <0.1 | 0.6 |
| | Polyimide film | 0.6 | 0.7 | <0.1 | 0.5 |
| | Polycarbonate | 0.5 | 0.6 | <0.1 | 0.5 |

Note:
Units = MPa

Example 8

(B) 100 parts of a (meth)acryloyl group containing organopolysiloxane with a structure shown below,

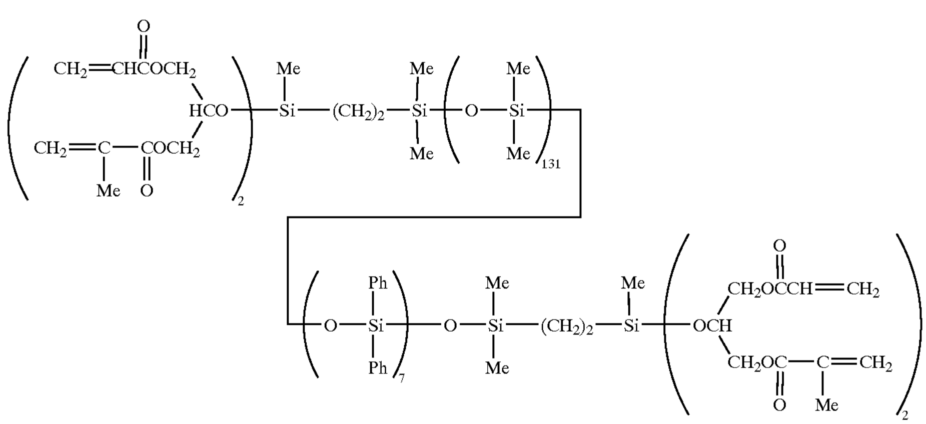

(D1) 2 parts of 2-hydroxy-2-methyl-1-phenylpropan-1-one, (D2) 1 part of 2,4,6-trimethylbenzoyldiphenylphosphine oxide, (F) 3 parts of tetramethoxysilane, and (E) 5 parts of a methylhydrogenpolysiloxane represented by a formula shown below,

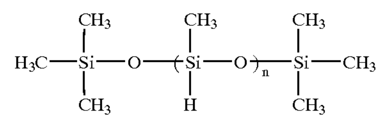

(wherein, n=38)

were mixed together and yielded a radiation curing organopolysiloxane composition.

This composition was poured into a Ni plated mold (height 100 mm×width 100 mm×depth 1 mm), and then irradiated with ultraviolet radiation (radiation dose: 800 mJ/cm$^2$) for 2 seconds inside a conveyor furnace equipped with two metal halide mercury lamps (illumination intensity: 400 mW/cm$^2$) to cure the composition. The hardness of the thus obtained adhesive silicone elastomer film was measured in accordance with JIS K6301. The hardness value was measured using a spring type A hardness tester. The result is shown in Table 6. Next, the silicone elastomer film was cut into pieces 25 mm high×10 mm wide, a piece of film was sandwiched between two test piece substrates (boards) formed from aluminum, silicon wafer, polyimide film, glass or polycarbonate, and each structure was then crimped at a pressure of 9.81 kPa (100 gf/cm$^2$) and heated for 60 minutes at 150° C. to cure the film and complete the production of a structural body. The shear adhesion was then measured. The results are shown in Table 7.

Example 9

With the exception of using 3 parts of a partial hydrolysis-condensation product of tetramethoxysilane (a methoxysiloxane oligomer) represented by a formula shown below instead of the 3 parts of tetramethoxysilane of the constituent (F), a composition was prepared in the same manner as the example 8.

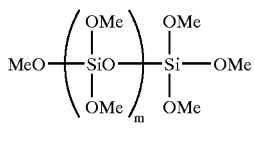

(a mixture in which m represents an integer of 1 to 7)

This composition was then used to produce an adhesive silicone elastomer film and a series of structural bodies, which were subjected to the same tests as the example 8. The results of the tests are shown in Table 6 and Table 7.

Example 10

With the exception of using 3 parts of a partial hydrolysis-condensation product of tetraethoxysilane (an ethoxysiloxane oligomer) represented by a formula shown below instead of the 3 parts of tetramethoxysilane of the constituent (F), a composition was prepared in the same manner as the example 8.

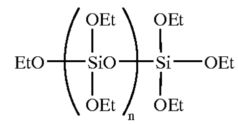

(a mixture in which n represents an integer of 1 to 7)

This composition was then used to produce an adhesive silicone elastomer film and a series of structural bodies, which were subjected to the same tests as the example 8. The results of the tests are shown in Table 6 and Table 7.

Examples 11 to 14

With the exception of altering the quantity of each of the constituents used in the example 9 to the values shown in Table 3, compositions were prepared in the same manner as the example 9, and each of these compositions was then used to produce an adhesive silicone elastomer film and a series of structural bodies, which were subjected to the same tests as the example 8. The results of the tests are shown in Table 6, Table 7 and Table 8.

TABLE 3

| Raw materials | Example 11 | Example 12 | Example 13 | Example 14 |
|---|---|---|---|---|
| Acryloylorganopolysiloxane | 100 parts | 100 parts | 100 parts | 100 parts |
| 2-hydroxy-2-methyl-1-phenylpropan-1-one | 2 parts | 2 parts | 2 parts | 2 parts |
| 2,4,6-trimethylbenzoyldiphenylphosphine oxide | 1 part | 1 part | 1 part | 1 part |
| Partial hydrolysis-condensation product of tetramethoxysilane | 3 parts | — | 3 parts | 3 parts |
| Si—H group containing organopolysiloxane | 0.5 parts | 3 parts | 10 parts | 30 parts |

Examples 15 to 18

With the exceptions of using (E) hydrosilyl group containing organohydrogenpolysiloxanes represented by the formulas shown below, and (F) partial hydrolysis-condensation products of tetramethoxysilane represented by the formulas shown below in the quantities shown in Table 4, compositions were prepared in the same manner as the example 9, and each of these compositions was then used to produce an adhesive silicone elastomer film and a series of structural bodies, which were subjected to the same tests as the example 8. The results of the tests are shown in Table 6 and Table 8.

TABLE 4

| Raw materials | Example 15 | Example 16 | Example 17 | Example 18 |
|---|---|---|---|---|
| Acryloylorganopolysiloxane | 100 parts | 100 parts | 100 parts | 100 parts |
| 2-hydroxy-2-methyl-1-phenylpropan-1-one | 2 parts | 2 parts | 2 parts | 2 parts |
| 2,4,6-trimethylbenzoyldiphenylphosphine oxide | 1 part | 1 part | 1 part | 1 part |
| Partial hydrolysis-condensation product of tetramethoxysilane | — | 3 parts | 5 parts | — |
| Partial hydrolysis-condensation product 1, shown below | 2 parts | — | — | 1 part |

TABLE 4-continued

| Raw materials | Example 15 | Example 16 | Example 17 | Example 18 |
|---|---|---|---|---|
| Partial hydrolysis-condensation product 2, shown below | — | — | — | 2 parts |
| Organohydrogenpolysiloxane 1, shown below | 10 parts | — | — | — |
| Organohydrogenpolysiloxane 2, shown below | — | 20 parts | — | — |
| Organohydrogenpolysiloxane 3, shown below | — | — | 10 parts | — |
| Organohydrogenpolysiloxane 4, shown below | — | — | — | 8 parts |

Partial Hydrolysis-Condensation Product 1

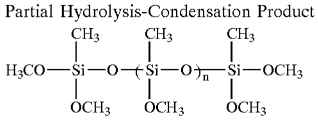

(wherein, n = 8)

Partial Hydrolysis-Condensation Product 2

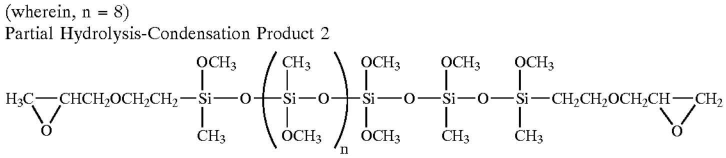

(wherein, n = 6)

Organohydrogenpolysiloxane 1

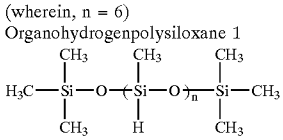

(wherein, n = 38)

Organohydrogenpolysiloxane 2

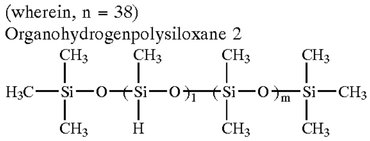

(wherein, 1 = 10, m = 8)

Organohydrogenpolysiloxane 3

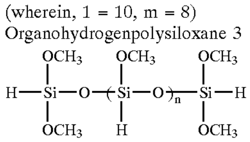

(wherein, the average value of n = 8)

Organohydrogenpolysiloxane 4

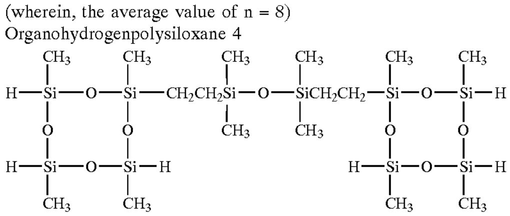

Comparative Example 5

With the exception of not adding the methylhydrogenpolysiloxane represented by the formula shown below as the constituent (E),

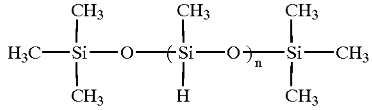

(wherein, n=38)

a composition was prepared in the same manner as the example 8, and the composition was then used to produce an adhesive silicone elastomer film and a series of structural bodies, which were subjected to the same tests as the example 8. The results of the tests are shown in Table 6 and Table 9.

Comparative Examples 6 to 9

With the exception of altering the quantities of (E) the hydrosilyl group containing organohydrogenpolysiloxane, and (F) the partial hydrolysis-condensation product of tetramethoxysilane, to the values shown in Table 5, compositions were prepared in the same manner as the example 9, and each of these compositions was then used to produce an adhesive silicone elastomer film and a series of structural bodies, which were subjected to the same tests as the example 8. The results of the tests are shown in Table 6 and Table 9.

TABLE 5

| Raw materials | Comparative example 6 | Comparative example 7 | Comparative example 8 | Comparative example 9 |
|---|---|---|---|---|
| Acryloylorganopolysiloxane | 100 parts | 100 parts | 100 parts | 100 parts |
| 2-hydroxy-2-methyl-1-phenylpropan-1-one | 2 parts | 2 parts | 2 parts | 2 parts |
| 2,4,6-trimethylbenzoyldiphenylphosphine oxide | 1 part | 1 part | 1 part | 1 part |
| Partial hydrolysis-condensation product of tetramethoxysilane | 50 parts | 3 parts | 3 parts | 50 parts |
| Organohydrogenpolysiloxane 1, shown above | 60 parts | 0.2 parts | 60 parts | 0.3 parts |

TABLE 6

<Hardness values following irradiation at 800 mJ/cm$^2$>

| | Examples | | | | | | | | | | |
|---|---|---|---|---|---|---|---|---|---|---|---|
| | 8 | 9 | 10 | 11 | 12 | 13 | 14 | 15 | 16 | 17 | 18 |
| Hardness | 48 | 47 | 47 | 49 | 47 | 40 | 22 | 40 | 30 | 40 | 41 |

| | Comparative example 5 | Comparative example 6 | Comparative example 7 | Comparative example 8 | Comparative example 9 |
|---|---|---|---|---|---|
| Hardness | 50 | gel | 50 | gel | gel |

Note:
Measurements were conducted using a spring type A hardness tester as specified in JIS K6301.

TABLE 7

| Heat curing conditions | Substrates | Examples 8 | 9 | 10 | 11 | 12 | 13 |
|---|---|---|---|---|---|---|---|
| 150° C. 60 minutes | Silicon wafer | 0.7 | 0.7 | 0.6 | 0.7 | 0.8 | 0.9 |
| | Aluminum | 0.7 | 0.8 | 0.7 | 0.8 | 0.9 | 0.9 |
| | Glass | 0.7 | 0.7 | 0.6 | 0.7 | 0.8 | 0.9 |
| | Polyimide film | 0.8 | 0.7 | 0.7 | 0.7 | 0.8 | 0.9 |
| | Polycarbonate | 0.7 | 0.7 | 0.6 | 0.7 | 0.8 | 0.8 |

Note:
Units = MPa

TABLE 8

| Heat curing conditions | Substrates | Examples 14 | 15 | 16 | 17 | 18 |
|---|---|---|---|---|---|---|
| 150° C. 60 minutes | Silicon wafer | 0.8 | 0.6 | 0.6 | 0.6 | 0.9 |
| | Aluminum | 0.9 | 0.7 | 0.7 | 0.7 | 0.9 |
| | Glass | 0.8 | 0.6 | 0.6 | 0.6 | 0.9 |
| | Polyimide film | 0.8 | 0.7 | 0.7 | 0.7 | 0.9 |
| | Polycarbonate | 0.8 | 0.6 | 0.6 | 0.6 | 0.8 |

Note:
Units = MPa

TABLE 9

| Heat curing conditions | Substrates | Comparative Examples 5 | 6 | 7 | 8 | 9 |
|---|---|---|---|---|---|---|
| 150° C. 60 minutes | Silicon wafer | 0.5 | <0.1 | 0.5 | <0.1 | <0.1 |
| | Aluminum | 0.5 | <0.1 | 0.5 | <0.1 | <0.1 |
| | Glass | 0.5 | <0.1 | 0.5 | <0.1 | <0.1 |
| | Polyimide film | 0.5 | <0.1 | 0.5 | <0.1 | <0.1 |
| | Polycarbonate | 0.4 | <0.1 | 0.4 | <0.1 | <0.1 |

Note:
Units = MPa

A radiation curing silicone rubber composition of the present invention is converted to a clean adhesive silicone elastomer film of uniform shape by a short term irradiation following molding.

This adhesive silicone elastomer film offers the following advantages:

(1) the film displays powerful adhesion and good workability, and can consequently be formed into an adhesive layer of a prescribed shape by cutting;

(2) the film has low elasticity, and consequently displays good relaxation of thermal and mechanical stress which develops when two different substrates are bonded together, leading to an improvement in the stability and reliability of a bonded product;

(3) the film is a cured product, and is consequently easy to handle; and (4) the film is supplied as a film type molded product, and consequently enables a rationalization of the usage process (the process for producing a bonded product).

What is claimed is:

1. A radiation curing silicone rubber composition comprising:

(A) 5 to 100 parts by weight of an organohydrogenpolysiloxane with at least one group selected from the group consisting of acryloyl groups and methacryloyl groups, and at least one hydrosilyl group within each molecule, (B) 95 to 0 parts by weight of a liquid organopolysiloxane with at least two groups selected from the group consisting of acryloyl groups and methacryloyl groups within each molecule, and with no hydrosilyl groups, wherein, a combined weight of said constituent (A) and said constituent (B) is 100 parts by weight, (C) 0.1 to 30 parts by weight of at least one compound selected from the group consisting of alkoxysilanes, partial hydrolysis-condensation products of alkoxysilanes, organosilane modified isocyanurates and organosiloxane modified isocyanurates, and (D) an effective quantity of a radiation sensitizer.

2. The composition according to claim 1, wherein said constituent (A) is an organohydrogenpolysiloxane with 2 to 4 groups selected from the group consisting of acryloyl groups and methacryloyl groups within each molecule.

3. The composition according to claim 1, wherein said constituent (A) is an organohydrogenpolysiloxane with 2 to 200 hydrosilyl groups within each molecule.

4. The composition according to claim 1, wherein said constituent (A) is an organohydrogenpolysiloxane with 20 to 200 silicon atoms within each molecule.

5. The composition according to claim 1, wherein said constituent (B) is a liquid organopolysiloxane with 2 to 18 groups selected from the group consisting of acryloyl groups and methacryloyl groups within each molecule.

6. The composition according to claim 1, wherein said constituent (B) is a liquid organopolysiloxane with 4 to 12 groups selected from the group consisting of acryloyl groups and methacryloyl groups within each molecule.

7. The composition according to claim 1, comprising from 20 to 90 parts by weight of said constituent (A), and from 80 to 10 parts by weight of said constituent (B).

8. An adhesive silicone elastomer film produced by forming a composition according to claim 1 into a film, and subjecting said film to radiation curing.

9. A silicone elastomer film-coated body produced by covering a portion of, or all of a substrate with an adhesive silicone elastomer film according to claim 8, and subsequently applying heat and bonding said film to said substrate.

10. A structural body produced by sandwiching an adhesive silicone elastomer film according to claim 8 between two substrates, and subsequently applying heat and bonding said film, thereby joining said two substrates together.

11. A die bonding method, wherein an adhesive silicone elastomer film according to claim 8 is positioned between a die and a predetermined position of a substrate on which said die is to be mounted, and said film is heated and bonded while positioned between said die and said substrate.

12. A radiation curing silicone rubber composition, comprising:

(B) 100 parts by weight of a liquid organopolysiloxane with 4 –18 groups selected from the group consisting of acryloyl groups and methacryloyl groups that are bonded to the silicon atoms at each terminal of the organopolysiloxane molecule, and with no hydrosilyl groups within each molecule, (D) an effective quantity of a radiation sensitizer, and (E) 0.5 to 50 parts by weight of an organohydrogenpolysiloxane with at least one hydrosilyl group within each molecule, and with neither acryloyl groups nor methacryloyl groups.

13. The composition according to claim 12, wherein said constituent (B) is a liquid organopolysiloxane with 4 to 12 groups selected from the group consisting of acryloyl groups and methacryloyl groups within each molecule.

14. The composition according to claim 12, wherein said constituent (E) is an organohydrogenpolysiloxane with 3 to 100 hydrosilyl groups within each molecule.

15. The composition according to claim 12, wherein said constituent (E) is an organohydrogenpolysiloxane with 4 to 150 silicon atoms within each molecule.

16. The composition according to claim 12, further comprising (F) no more than 50 parts by weight of a compound selected from the group consisting of alkoxysilanes and partial hydrolysis-condensation products of alkoxysilanes.

17. An adhesive silicone elastomer film obtainable by forming a composition according to claim 12 into a film, and subjecting said film to radiation curing.

18. A silicone elastomer film-coated body obtainable by covering a portion of, or all of a substrate with an adhesive silicone elastomer film according to claim 17, and subsequently applying heat and bonding said film to said substrate.

19. A structural body obtainable by sandwiching an adhesive silicone elastomer film according to claim 17 between two substrates, and subsequently applying heat and bonding said film, thereby joining said two substrates together.

20. A die bonding method, wherein an adhesive silicone elastomer film according to claim 17, is positioned between a die and a predetermined position of a substrate on which said die is to be mounted, and said film is heated and bonded while positioned between said die and said substrate.

* * * * *